US009250646B2

(12) United States Patent
Hazelet (10) Patent No.: US 9,250,646 B2
(45) Date of Patent: Feb. 2, 2016

(54) CLOCK RECOVERY USING REMOTE ARRIVAL TIMESTAMPS (71) Applicant: Keith Hazelet, Chandler, AZ (US)

(72) Inventor: Keith Hazelet, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 445 days.

(21) Appl. No.: 13/719,795

(22) Filed: Dec. 19, 2012

(65) Prior Publication Data
US 2014/0173136 A1 Jun. 19, 2014

(51) Int. Cl.
G06F 15/16 (2006.01)
G06F 1/14 (2006.01)
G06F 1/12 (2006.01)

(52) U.S. Cl.
CPC ... G06F 1/14 (2013.01); G06F 1/12 (2013.01)

(58) Field of Classification Search
CPC ..................................... G06F 1/14; G06F 1/12
USPC .................................. 709/230, 231, 248, 250
See application file for complete search history.

(56) References Cited

U.S. PATENT DOCUMENTS 6,661,846 B1* 12/2003 Ota .......................... 375/240.28
7,533,402 B2* 5/2009 Demas et al. ................... 725/71
8,447,003 B2* 5/2013 Tatsuta et al. ................. 375/354
8,639,830 B2* 1/2014 Bowman ....................... 709/231
8,699,646 B2* 4/2014 Olsen et al. ................... 375/354
2004/0018005 A1 1/2004 Gates et al.
2010/0198992 A1 8/2010 Morrison et al.
2012/0257699 A1* 10/2012 Choi et al. ..................... 375/359

FOREIGN PATENT DOCUMENTS

KR 1020120066913 A 6/2012
KR 1020120135856 A 12/2012
WO 2009090728 A1 7/2009

OTHER PUBLICATIONS

International Search Report and Written Opinion dated Mar. 14, 2014 from International Application No. PCT/US2013/074082, 12 pages.

* cited by examiner

Primary Examiner — Viet Vu
(74) Attorney, Agent, or Firm — Jordan IP Law, LLC (57) ABSTRACT Methods and systems may provide for a sink module that receives packets from a source module, wherein each of the packets has a source timestamp corresponding to a source module packet arrival time. A reference timestamp may be associated with the source timestamp of the most recent packet having a program clock reference. A sink counter may be synchronized to a broadcaster transmit counter based on a current source timestamp and the reference timestamp. The sink counter and the source counter may be driven by asynchronous clocks, wherein the current source timestamp may be inferred based on a current value of the source counter. The packets may include video data and/or audio data. The sink counter may be synchronized by adjusting the frequency of a source clock and/or adjusting the sink counter.

28 Claims, 6 Drawing Sheets

CLOCK RECOVERY USING REMOTE ARRIVAL TIMESTAMPS

BACKGROUND

Clock recovery pertains to mechanisms used to adjust the frequency of a device's local clock based on a remote device's clock. This is typically used in Multi-channel Video Programming Distributors (MVPDs) to service content over cable, the Internet, satellite, combinations thereof, and/or the like. A head-end station may send video content to home gateways, clients, and/or the like, wherein the video content may be streamed at a rate dictated by the head-end equipment. Local clients may be expected to present the content in sync with the head-end reference clock. An inability to recover the clock may result in buffering under- and over-runs that may be perceived by the viewer as audio and video artifacts (i.e., frame drops or repeats).

Generally, MPEG (Moving Picture Experts Group) clock recovery is performed by comparing the rate of the advancement of a local counter driven by the local clock to the rate of advancement of incoming PCR values (Program Clock Reference—field used to encode source clock information in an MPEG stream). While such an approach may be suitable under certain circumstances, there remains considerable room for improvement. For example, conventional systems may lack a hardware mechanism to determine the value of the local counter as close as possible to the arrival time of a given packet carrying the PCR, which may lead to unacceptable jitter.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments of the present invention may provide a mechanism to recover a clock on systems that do not have a hardware mechanism for syncing a local clock with a remote clock.

Figure 1:
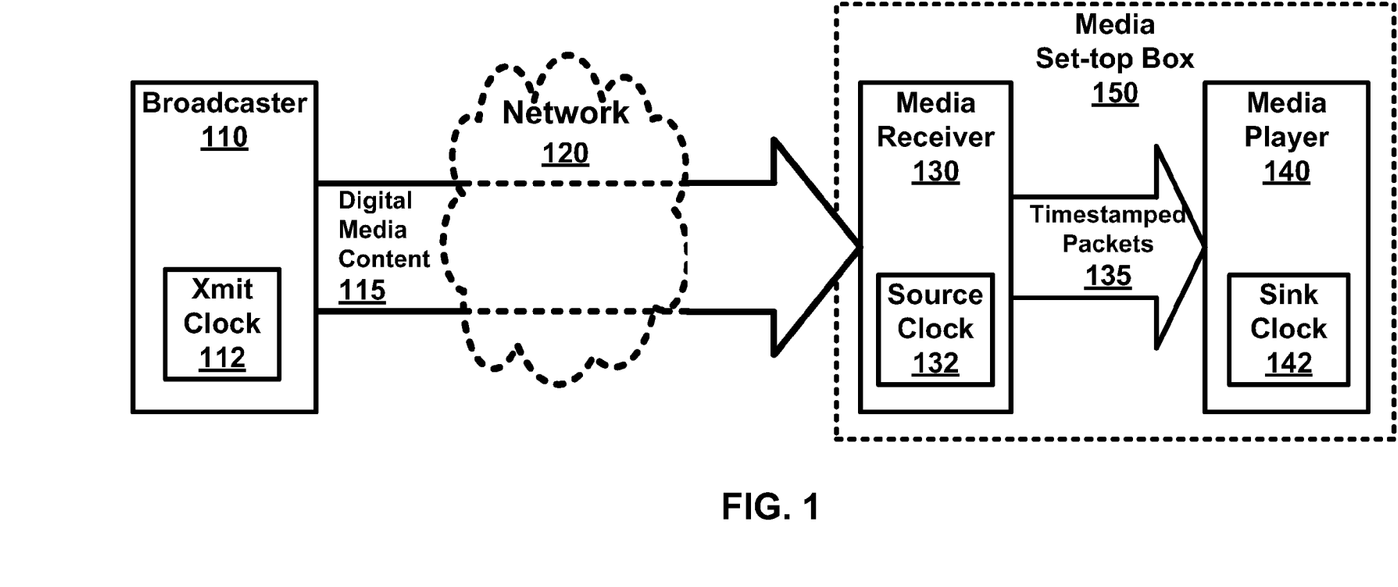
FIG. 1-3 illustrate example media systems with clock recovery as per aspects of an embodiment of the present invention.

FIG. 1 is a diagram of a video system that may transmit digital media content 115 from a broadcaster 110 to a device such as a media box 150 through a medium such as a network 120. Thus, the media box 150 may be a media set-top box. Other examples of media box 150 may include, for example, computers, television sets, smart phones, tablets, streaming devices, combinations thereof, and/or the like. Basically, media box 150 may be a device that is configured to receive and play digital media content. The network 120 may include many types of transport mediums such as satellite, phone, optical, radio frequency (RF), intranet, Internet, a combination thereof, and/or the like.

The media box 150 may include a media receiver 130 and a media player 140. The media receiver 130 may be configured to receive digital media content packets 115 and generate timestamped digital media content packets 135. Media player 140 may be configured to receive and play the timestamped digital media content packets 135. The broadcaster 110, media receiver 130 and media player 140 may have asynchronous clocks (112, 132 and 142 respectively) that operate at approximately the same frequency.

In some of the various embodiments, there may be multiple processors in systems that do not share clock signals. For example, a source module (such as media receiver 130) and sink module (such as media player 140) may operate using different processors, different systems on a chip (SoC), different hardware, different software in combination with hardware, a combination thereof, and/or the like. A source processor operating as part of media receiver 130 may be responsible for time stamping incoming packets 115. A second sink processor, on the other hand, operating as part of the media player 140 may be responsible for performing clock recovery as needed to sync the playback clock 142 to the head-end transmit clock 112.

Some example embodiments in which this situation applies may be described as follows: (1) there may be two processors involved in the media box 150, (2) the processor implementing audio-visual (A/V) playback may not be the same as the front-end processor responsible for receiving the A/V stream, (3) the processor implementing A/V playback may not be using a normal MPEG input and may not have time stamping capability on the chosen input, (4) the processors do not share a clock signal, and (5) the stream latency/jitter between the two processors is relatively constant.

Figure 2:
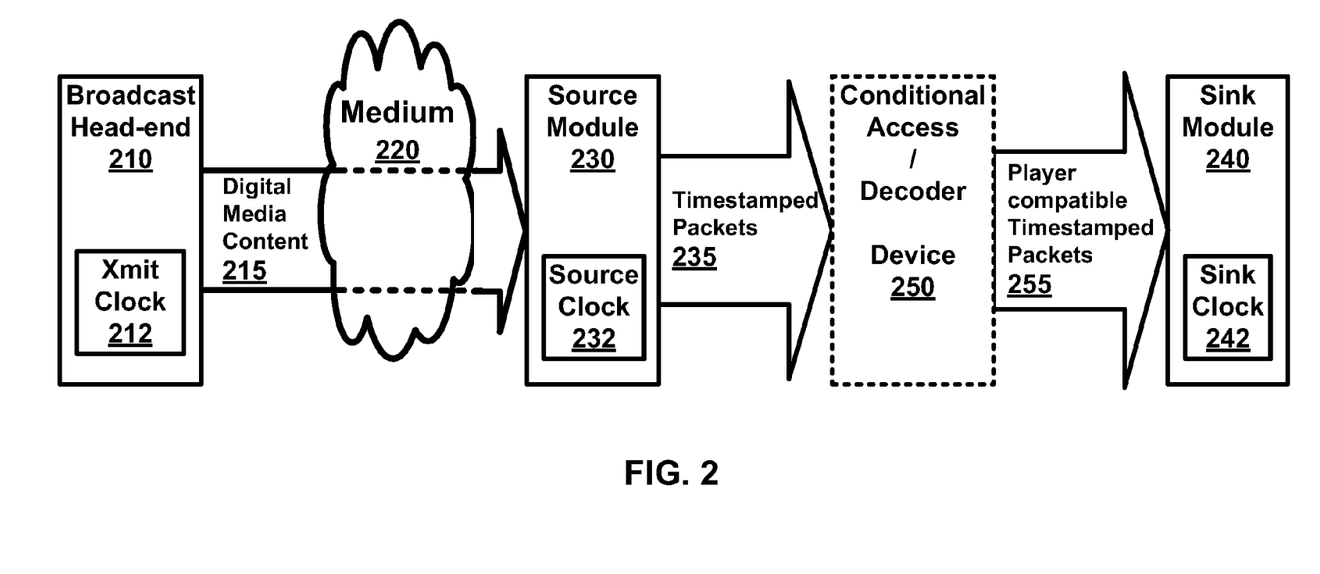

FIG. 2 is a diagram of a video system that may transmit digital media content 215 from a broadcast head end 210 (having a clock 212) to a source module 230 (having a clock 232) via a medium 220. The source module 230 may be a media receiver. A media receiver may include a media extender, a media streamer, a digital media hub, a digital media adapter (DMA), and/or the like. A media receiver may be module that may connect to a network to retrieve digital media files (such as music, pictures, or video) from a server, a broadcaster, a personal computer, another networked media server, and/or the like.

Some media receivers may have integrated displays and speakers. Others may need to connect to an external output device such as sink module 240. Examples of stand-alone digital media receivers include Apple TV available from Apple, Inc. of Cupertino, Calif., NeoTV available from Netgear Inc. of San Jose, Calif. and WDTV available from Western Digital of Irvine, Calif. It is also common to find media player functionality integrated into consumer-electronic appliances, such as gaming machines, DVD players, set-top boxes, or even connected HDTVs. Media receivers may also support connecting to internet services, such as Netflix, Hulu, YouTube, Vimeo, and/or the like.

Software in combination with hardware may sometimes be used to connect a computer to a media receiver. For example, Microsoft Media Center is software that comes with a version of Microsoft Windows named Media Center Edition. Some media receivers may connect to that software to stream music, pictures and recorded or live TV originating from the computer. The medium 220 may be a communications medium such as a network, a fiber optic, a cable, a satellite transmission, a combination thereof, and/or the like.

As illustrated in example FIG. 2, a source module 230 may transmit each of its packets with a timestamp 235 to enable a sink module 240 (having a sink clock 242) with arrival time information. On a system, such as an OpenCable system, this may be natural, as the standard OpenCable transport headers include a "local timestamp." Information about the Open- Cable standards may be obtained from Cable Television Laboratories, Inc. of Louisville, Colo. This timestamp may derive from source clock 232, which may be in a different domain than the playback clock 242 since the processors may not be sharing a clock signal. However, this may not be significant as long as the time through another (optional) device such as a module 250 is relatively constant (e.g. less than approximately 1 mS of jitter). The module 250 may be a cable card, a conditional access card, a decoder, a combination thereof and/or the like. The module 250, when part of a system, may generate new timestamped packets 255 from the timestamped packets 235, wherein the new timestamped packets 255 may be are compatible with the sink module 240. The sink module 240 may be a media player such as a computer, a television, a stereo system, a smart phone, a tablet, a combination thereof, and/or the like.

When the sink module 240 receives packets 235 or 255, the sink module 240 may eventually detect a packet with a PCR encoded. It may not need to detect a packet with a PCR encoded immediately after receiving the packet and some delay may be expected if software in combination with hardware is being used to detect PCR arrival. This technique may address the case where the sink module 240 may be used in an unusual way and may not have the ability to parse PCR values in a real-time manner.

The sink module 240 may estimate what the counter driven from the A/V clock was when the packet arrived. The timestamp added to the packet containing the PCR may be used for this purpose. From these, a couple of techniques may be used to estimate how much time elapsed between the current time (when software in the sink module 240 detected the PCR) and when the packet was time stamped in the source module 230. Knowing how much time elapsed may allow an estimation of what a local counter was when the packet arrived. The PCR and estimated local counter value may be employed to carry out clock recovery in a traditional manner.

Figure 3:
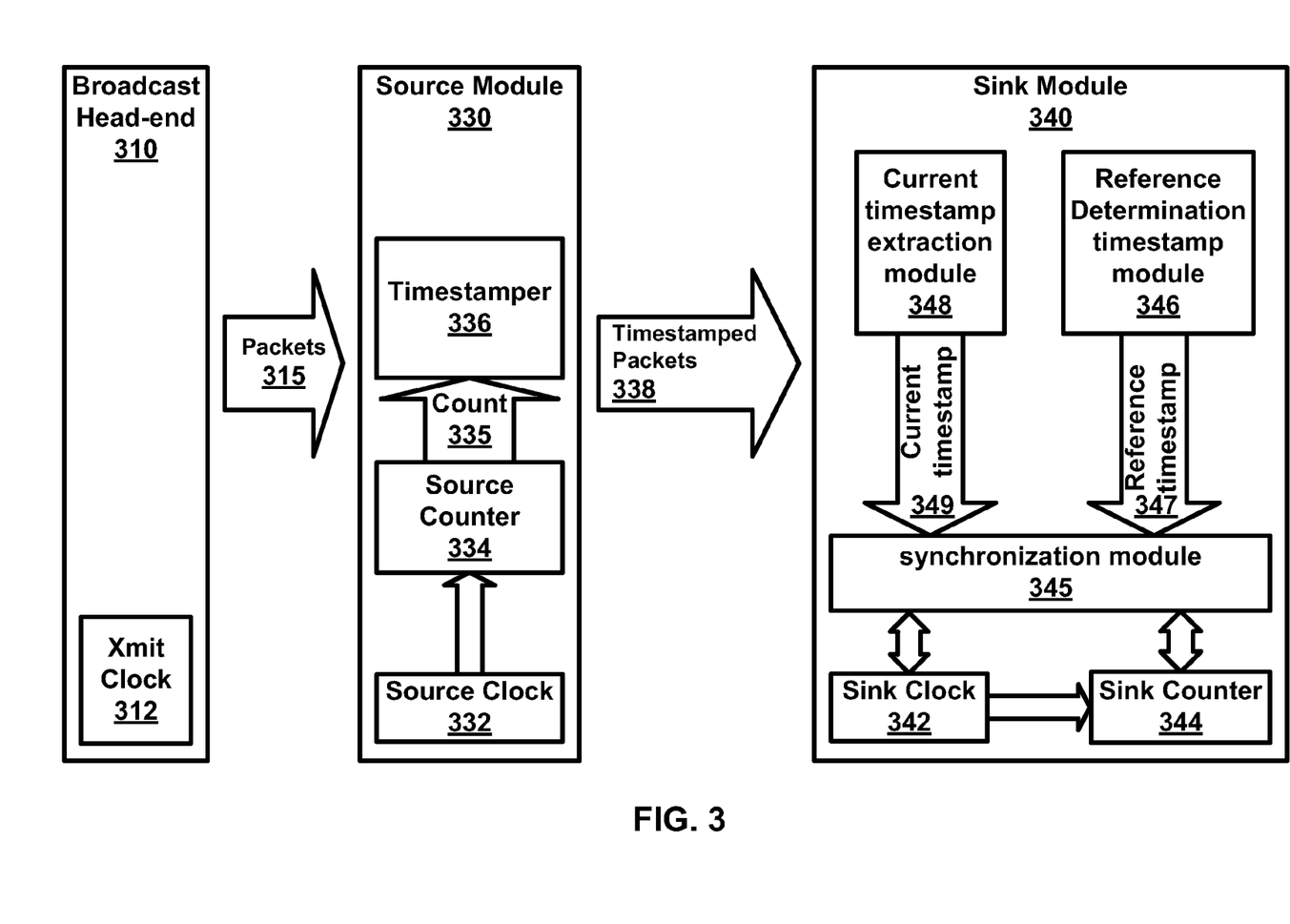

FIG. 3 is a block diagram of a media system with clock recovery as per an aspect of an embodiment of the present invention. The system has a broadcast head-end 310, a source module 330 and sink module 340. The broadcast head-end 310 may have an Xmit clock 312. The broadcast head-end 310 may be a server, a computer, or other device configured to broadcast or otherwise send packetized content 315 over a medium to the source module 330. The packetized content 315 may include audio content, video content, a combination thereof (e.g. audio-video content), and/or the like.

The source module 330 may include a source input, a source counter 334, and a timestamper 336. The source input may be configured to receive the plurality of packets 315 from the broadcast head-end 310. The source input may include a connection such as an Ethernet connection, a modem connection, a disc, a fiber optic connection, an RF connection, a combination thereof, and/or the like. The source counter 334 may generate a count 335 that may be incremented by source clock 332. Source clock 332 may have a frequency that is approximately the same as Xmit clock 312. Timestamper 336 may add a source timestamp to each of the plurality of packets 315 based on source counter 334.

Sink module 340 may include a sink input, a reference timestamp module 346, a sink counter 344, a sink clock 342, and a synchronization module 345. The sink input may receive the plurality of timestamped packets 338 from source module 330. The sink module 340 may be a playback module configured to play back the digital content transported in packets 315 and/or 338. The digital content 315 and/or 338 may be MPEG encoded content. However, one skilled in the art will recognize that the digital content 315 and/or 338 may be encoded using other encoding schemes such as X264, DivX, WMV (Windows Media Video), VP8, and/or the like.

Reference timestamp module 346 may be configured to associate as a reference timestamp 347, the source timestamp 349 of the most recent packet in the plurality of packets 338 having a program clock reference.

The sink counter 344 may be incremented by sink clock 342. Sink clock 342 may have a frequency that is approximately the same as Xmit clock 312 and/or source clock 332.

Synchronization module 345 may synchronize the sink counter 344 to the Xmit clock 312 using a current source timestamp 349 and the reference timestamp 347. The current timestamp 349 may be extracted from the timestamped packets 338 by a current timestamp extraction module 348. The Xmit clock 312, source clock 332 and sink clock 342 may be asynchronous. As such the sink counter 344 and the source counter 332 may also be asynchronous clocks. The synchronization module 345 may infer the current source timestamp 349 based on a current value of the source counter 334.

According to some of the various embodiments, an example technique for deriving the playback clock value when the packet arrived in the source module 330 is described. PCR(i) represents the current PCR value. TS(i) represents the reference timestamp 345 assigned to the packet having a PCR packet. TS(n) represents the current timestamp 349 assigned to the latest received packet (generally in a buffer of packets). PCLK(n) represents the current playback counter value (344). SCLK(n) represents the current source counter value (335).

PCLK(i), the value of the playback clock at PCR packet arrival may be obtained in the following way. SCLK(n) may be set to TS(n). PCLK(i) may be set to PCLK(n)-freq_adj (SCLK(n)-TS(i)). PCLK(i) and PCR(i) may be employed to recover the clock.

In order to estimate the PCLK(i) value, SCLK(n) may first need to be estimated. The estimated SCLK(n) and TS(i) may be used to determine how long ago the packet (in packets 315) was time stamped by timestamper 336 in the source module's clock domain. Software in combination with hardware, firmware, and/or the like may correct for large known frequency differences (freq_adj). The synchronization module 345 may use a sink clock frequency adjustment module and/or a sink counter adjustment module to correct frequency differences. Small differences in frequency due to oscillator variations may be insignificant if the delay between the two SOCs is minor when due to the counters not having diverged much.

In order to determine the current remote counter value, the timestamp of the most recently received packet 349 (TS(n)) may be examined. An accurate estimate may be obtained assuming that packets 338 are sent relatively frequently and that the latency between time stamping and receiving is approximately constant. For example, if a 20 megabit channel was being watched a packet should arrive every 75 uS. The use of TS(n) to infer SCLK(n) may be eliminated if the sink module 330 may directly read the source device timestamp counter 334 without latency. Such an approach, however, is may not be required for this embodiment to function properly.

This example embodiment may allow for clock recovery with substantially less jitter than attempting to determine the arrival timestamp employing software in combination with hardware, firmware, and/or the like. Less jitter may translate into a faster lock to the reference clock, which means less buffering may be required by clients, ultimately making the channel-change time faster.

In some of the various embodiments, the source module 330 and the sink module 340 may be co-located. For example, an embodiment may be a set-top box that both receives and plays back the digital content.

Figure 4:
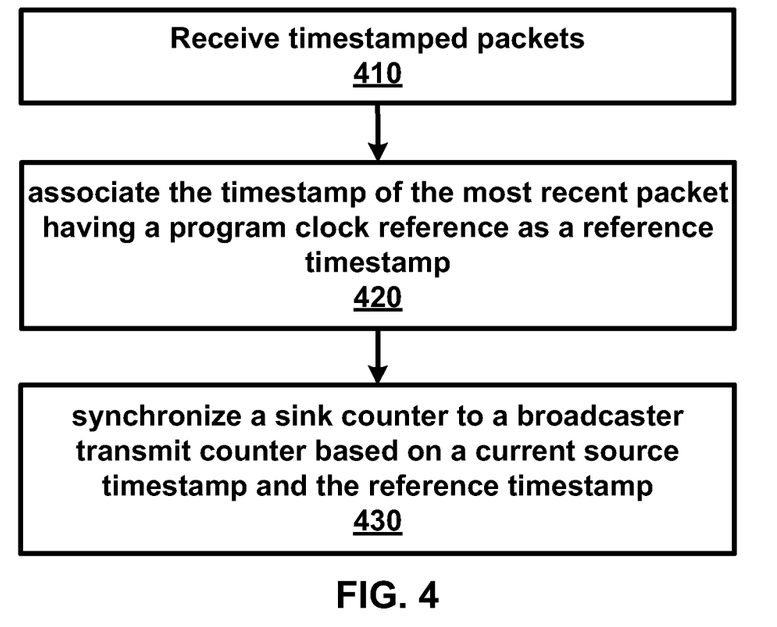
FIG. 4 is a flow diagram of an example clock recovery mechanism as per an aspect of an embodiment of the present invention.

FIG. 4 is a flow diagram of an example clock recovery mechanism as per an aspect of an embodiment of the present invention. In some of the various embodiments, this clock recovery mechanism may be performed at a sink device to recover a clock, such as an MPEG clock, to synchronize the playback of an MPEG stream. The sink device may be a playback module. The playback module may be configured to process and playback an MPEG transport stream. An MPEG transport stream (MPEG-TS, MTS or TS) is a standard format for transmission and storage of audio, video, and Program and System Information Protocol (PSIP) data. It may be used in broadcast systems such as DVB (Digital Video Broadcasting), ATSC (Advanced Television Systems Committee) and IPTV (Internet Protocol Television). A specification of a transport stream that may be used in some of the embodiments may be found in the MPEG-2 Part 1, Systems specification (formally known as ISO/IEC standard 13818-1 or ITU-T Rec. H.222.0).

Transport stream(s) may specify a container format encapsulating packetized elementary streams, with error correction and stream synchronization features for maintaining transmission integrity when the signal is degraded. Transport streams may differ from similarly named program streams in several important ways: program streams may be designed for reasonably reliable media, such as discs (like DVDs), while transport streams may be designed for less reliable transmission, namely terrestrial or satellite broadcast. Further, a transport stream may carry multiple programs.

A packet may be the basic unit of data in a transport stream. Some packets start with a sync byte and a header. Additional optional transport fields, as signaled in an optional adaptation field, may follow. The rest of the packet may consist of a payload. Packets may be 188 bytes in length in some streams, but the communication medium may add some error correction bytes to the packet.

To enable a decoder to present synchronized content, such as audio tracks matching associated video, approximately 100 ms or less, a Program Clock Reference, or PCR may be transmitted in the adaptation field of an MPEG-2 transport stream packet. A packet Identifier (PID) with the PCR for an MPEG-2 program may be identified by a per_pid value in an associated Program Map Table. The value of the PCR, when properly used, may be employed to generate a system_timing_clock in a decoder. A system time clock decoder, may provide a time base that may be used to synchronize audio and video elementary streams. Timing in MPEG2 may reference this clock. For example, a presentation time stamp may be intended to be relative to the PCR. The first 33 bits may be based on a 90 kHz clock. The last 9 bits may be based on a 27 MHz clock. The maximum jitter for the PCR is approximately +/−500 ns.

A plurality of packets may be received at 410. The plurality of packets may be from a source module. Each of the plurality of packets may have a source timestamp corresponding to a source module packet arrival time. The source module packet arrival time may correspond to the time that the source module receives a packet from a broadcaster.

At 420, a reference timestamp may be associated with the source timestamp of a most recent packet in the plurality of packets having a program clock reference. A sink counter may be synchronized to a broadcaster transmit counter based on a current source timestamp and the reference timestamp at 430. In other words, the a current source timestamp and the reference timestamp may be used to measure (and minimize) software jitter the sink device may be experiencing due to causes such as lack of dedicated hardware timestamping logic. The sink clock, broadcaster Xmit clock and the source clock may be driven by asynchronous clocks. The current source timestamp may be inferred based on a current value of the source counter. Synchronizing the sink counter to the Xmit clock may include adjusting the frequency of a source clock, adjusting the sink counter, a combination thereof, and/or the like.

The process of FIG. 4 may be embodied as at least one non-transitory machine-readable medium comprising one or more instructions which, if executed by a processor, cause a computer to recover a clock as previously described.

Figure 5:
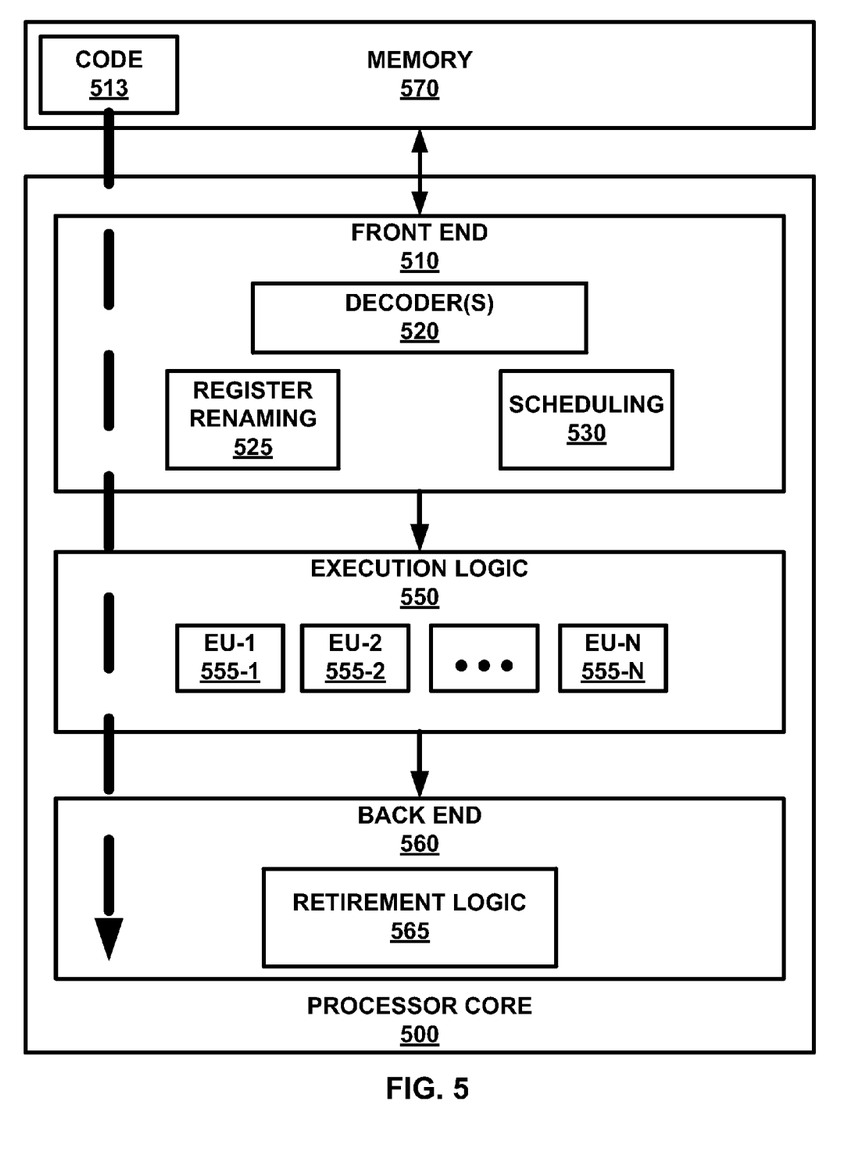
FIGS. 5 and 6 are illustrations of examples of embodiments of the present invention.

FIG. 5 illustrates a processor core 500 according to one embodiment. The processor core 500 may be the core for any type of processor, such as a micro-processor, an embedded processor, a digital signal processor (DSP), a network processor, or other device to execute code. Although only one processor core 500 is illustrated in FIG. 5, a processing element may alternatively include more than one of the processor core 500 illustrated in FIG. 5. The processor core 500 may be a single-threaded core or, for at least one embodiment, the processor core 500 may be multithreaded in that it may include more than one hardware thread context (or "logical processor") per core.

FIG. 5 also illustrates a memory 570 coupled to the processor 500. The memory 570 may be any of a wide variety of memories (including various layers of memory hierarchy) as are known or otherwise available to those of skill in the art. The memory 570 may include one or more code 513 instruction(s) to be executed by the processor 500 core, wherein the code 513 may implement the logic architecture illustrated in FIG. 6 through FIG. 8, already discussed. The processor core 500 follows a program sequence of instructions indicated by the code 513. Each instruction may enter a front end portion 510 and be processed by one or more decoders 520. The decoder 520 may generate as its output a micro operation such as a fixed width micro operation in a predefined format, or may generate other instructions, microinstructions, or control signals which reflect the original code instruction. The illustrated front end 510 also includes register renaming logic 525 and scheduling logic 530, which generally allocate resources and queue the operation corresponding to the convert instruction for execution.

The processor 500 is shown including execution logic 550 having a set of execution units 555-1 through 555-N. Some embodiments may include a number of execution units dedicated to specific functions or sets of functions. Other embodiments may include only one execution unit or one execution unit that can perform a particular function. The illustrated execution logic 550 performs the operations specified by code instructions.

After completion of execution of the operations specified by the code instructions, back end logic 560 retires the instructions of the code 513. In one embodiment, the processor 500 allows out of order execution but requires in order retirement of instructions. Retirement logic 565 may take a variety of forms as known to those of skill in the art (e.g., re-order buffers or the like). In this manner, the processor core 500 is transformed during execution of the code 513, at least in terms of the output generated by the decoder, the hardware registers and tables utilized by the register renaming logic 525, and any registers (not shown) modified by the execution logic 550.

Although not illustrated in FIG. 5, a processing element may include other elements on chip with the processor core

500. For example, a processing element may include memory control logic along with the processor core 500. The processing element may include I/O control logic and/or may include I/O control logic integrated with memory control logic. The processing element may also include one or more caches.

Figure 6:
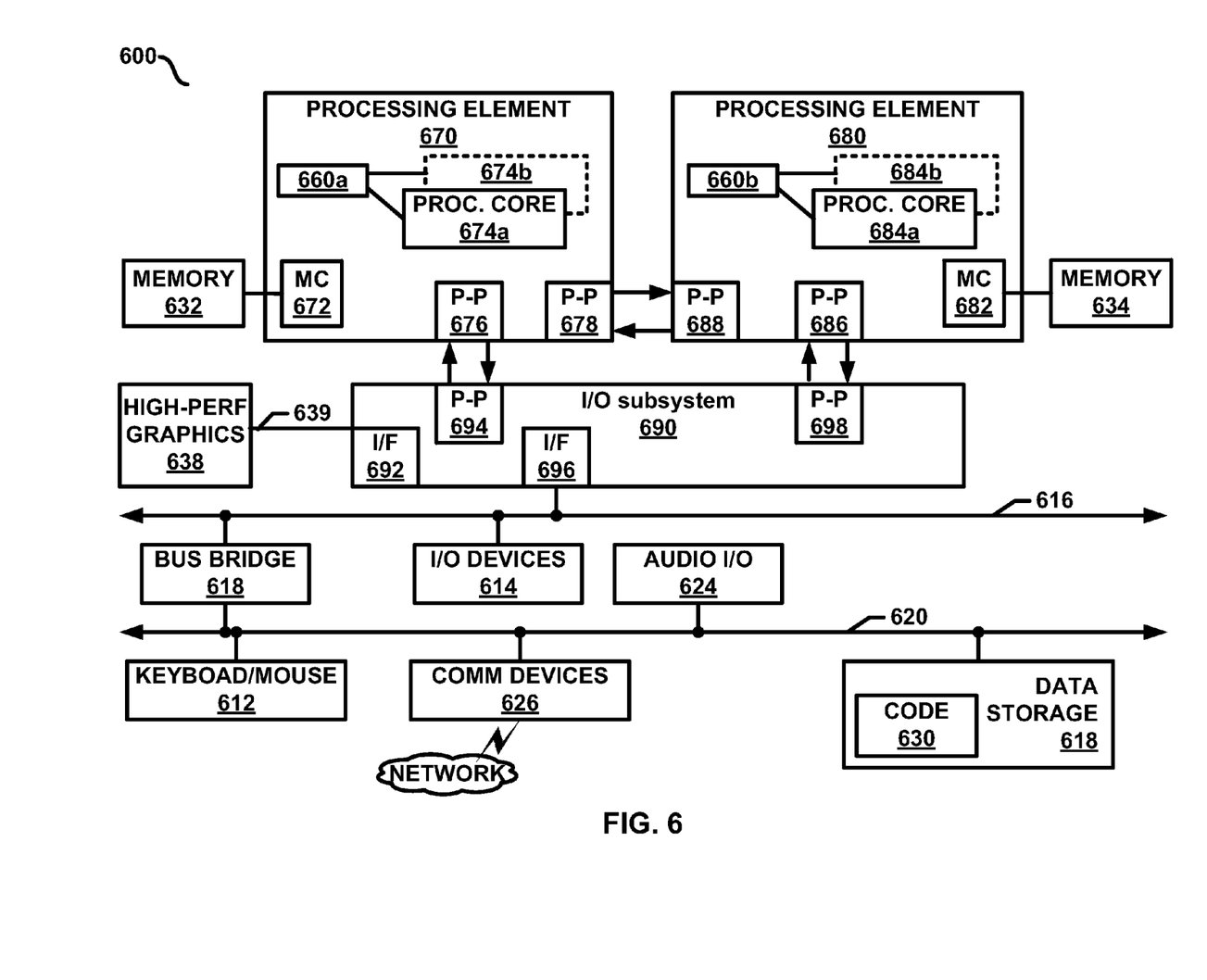

Referring now to FIG. 6, shown is a block diagram of a system embodiment 600 in accordance with an embodiment of the present invention. Shown in FIG. 6 is a multiprocessor system 600 that includes a first processing element 670 and a second processing element 680. While two processing elements 670 and 680 are shown, it is to be understood that an embodiment of system 600 may also include only one such processing element.

System 600 is illustrated as a point-to-point interconnect system, wherein the first processing element 670 and second processing element 680 are coupled via a point-to-point interconnect 650. It should be understood that any or all of the interconnects illustrated in FIG. 6 may be implemented as a multi-drop bus rather than point-to-point interconnect.

As shown in FIG. 6, each of processing elements 670 and 680 may be multicore processors, including first and second processor cores (i.e., processor cores 674a and 674b and processor cores 684a and 684b). Such cores 674, 674b, 684a, 684b may be configured to execute instruction code in a manner similar to that discussed above in connection with FIG. 6.

Each processing element 670, 680 may include at least one shared cache 660. The shared cache 660a, 660b may store data (e.g., instructions) that are utilized by one or more components of the processor, such as the cores 674a, 674b and 684a, 684b, respectively. For example, the shared cache may locally cache data stored in a memory 632, 634 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 670, 680, it is to be understood that the scope of the present invention is not so limited. In other embodiments, one or more additional processing elements may be present in a given processor. Alternatively, one or more of processing elements 670, 680 may be an element other than a processor, such as an accelerator or a field programmable gate array. For example, additional processing element(s) may include additional processors(s) that are the same as a first processor 670, additional processor(s) that are heterogeneous or asymmetric to processor a first processor 670, accelerators (such as, e.g., graphics accelerators or digital signal processing (DSP) units), field programmable gate arrays, or any other processing element. There can be a variety of differences between the processing elements 670, 680 in terms of a spectrum of metrics of merit including architectural, microarchitectural, thermal, power consumption characteristics, and the like. These differences may effectively manifest themselves as asymmetry and heterogeneity amongst the processing elements 670, 680. For at least one embodiment, the various processing elements 670, 680 may reside in the same die package.

First processing element 670 may further include memory controller logic (MC) 672 and point-to-point (P-P) interfaces 676 and 678. Similarly, second processing element 680 may include a MC 682 and P-P interfaces 686 and 688. As shown in FIG. 8, MC's 672 and 682 couple the processors to respective memories, namely a memory 632 and a memory 634, which may be portions of main memory locally attached to the respective processors. While the MC logic 672 and 682 is illustrated as integrated into the processing elements 670, 680, for alternative embodiments the MC logic may be discrete logic outside the processing elements 670, 680 rather than integrated therein.

The first processing element 670 and the second processing element 680 may be coupled to an I/O subsystem 690 via P-P interconnects 676, 686 and 684, respectively. As shown in FIG. 6, the I/O subsystem 690 includes P-P interfaces 694 and 698. Furthermore, I/O subsystem 690 includes an interface 692 to couple I/O subsystem 690 with a high performance graphics engine 638. In one embodiment, bus 649 may be used to couple graphics engine 638 to I/O subsystem 690. Alternately, a point-to-point interconnect 639 may couple these components.

In turn, I/O subsystem 690 may be coupled to a first bus 616 via an interface 696. In one embodiment, the first bus 616 may be a Peripheral Component Interconnect (PCI) bus, or a bus such as a PCI Express bus or another third generation I/O interconnect bus, although the scope of the present invention is not so limited.

As shown in FIG. 6, various I/O devices 614 such as sensor(s) 220 (FIG. 2) may be coupled to the first bus 616, along with a bus bridge 618 which may couple the first bus 616 to a second bus 610. In one embodiment, the second bus 620 may be a low pin count (LPC) bus. Various devices may be coupled to the second bus 620 including, for example, a keyboard/mouse 612, communication device(s) 626 (which may in turn be in communication with a computer network, not shown), and a data storage unit 618 such as a disk drive or other mass storage device which may include code 630, in one embodiment. The code 630 may include instructions for performing embodiments of one or more of the methods described above. Thus, the illustrated code 630 may implement the logic architecture illustrated in FIG. 1 through FIG. 3 and could be similar to the code 613 (FIG. 4), already discussed. Further, an audio I/O 624 may be coupled to second bus 620.

Note that other embodiments are contemplated. For example, instead of the point-to-point architecture of FIG. 6, a system may implement a multi-drop bus or another such communication topology. Also, the elements of FIG. 1 through FIG. 3 may alternatively be partitioned using more or fewer integrated chips than shown in FIG. 6.

Examples may therefore include a system having an input port to access one or more user identification sensors, a memory for storing an operating system and the one or more applications, a processor to execute at least operating system and at least one of the one or more applications and a user identification module to identify a specific user using at least one of the one or more user identification sensors. The system may also have an application configuration module to configure at least one of the one or more applications for the specific user and a display for presenting the output of at least one of the one or more applications.

Examples may also include an apparatus having one or more user identification sensors and an identification module to identify a specific user based on a signal from at least one of the one or more user identification sensors. The apparatus may also have an application configuration module to configure one or more applications for the specific user.

Examples may also include a method that involves monitoring a first user based on a signal from one or more user identification sensors and identifying the first user employing at least one of the one or more user identification sensors. The method can also provide for configuring one or more applications on a computing machine for the first user.

Examples may also include at least one non-transitory machine-readable medium comprising one or more instructions which, if executed by a processor, cause a computer to monitor a first user using one or more user identification sensors. The instructions, if executed, can also cause a computer to identify the first user employing at least one of the one or more user identification sensors and configure one or more applications on a computing machine for the first user.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and may have a defined interface to other elements. The modules described in this disclosure may be implemented in hardware, a combination of hardware and software, firmware, or a combination thereof, all of which are behaviorally equivalent. For example, modules may be implemented using computer hardware in combination with software routine(s) written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, punched cards and paper tapes, optical disks, barcodes, magnetic ink characters and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A system comprising:
a broadcast head-end;
a source module including:
a source input to receive a plurality of packets from the broadcast head-end;
a source counter incremented by a source clock; and
a timestamper to add a source timestamp to each of a plurality of packets based on the source counter; and
a sink module including:
a sink input to receive the plurality of packets from the source module;
a reference timestamp module to associate as a reference timestamp, the source timestamp of the most recent packet in the plurality of packets having a program clock reference;
a sink counter incremented by a sink clock; and
a synchronization module to synchronize the sink counter to a broadcaster transmit counter using a current source timestamp and the reference timestamp, wherein the source module and the sink module are co-located on a common device.

2. The system according to claim 1, wherein the source module is a playback module.

3. The system according to claim 1, wherein the source module is a receiver module.

4. The system according to claim 1, wherein the plurality of packets include one or more of video data and audio data.

5. An apparatus comprising:
an input module, implemented at least partly in one or more of configurable logic or fixed functionality logic hardware, to receive a plurality of packets from a source module having a source counter, each of the plurality of packets having a source timestamp corresponding to a source module packet arrival time;
a reference timestamp module, implemented at least partly in one or more of configurable logic or fixed functionality logic hardware, to associate as a reference timestamp, the source timestamp of a most recent packet in the plurality of packets having a program clock reference; and
a synchronization module, implemented at least partly in one or more of configurable logic or fixed functionality logic hardware, to synchronize a sink counter to a broadcaster transmit counter using a current source timestamp and the reference timestamp,
wherein the source module, the input module, the reference timestamp module, and the synchronization module are to be co-located on a common device.

6. The apparatus according to claim 5, wherein the sink counter and the source counter are to be driven by asynchronous clocks.

7. The apparatus according to claim 5, wherein the synchronization module is to infer the current source timestamp based on a current value of the source counter.

8. The apparatus according to claim 5, wherein the plurality of packets are to be received from a playback module.

9. The apparatus according to claim 5, wherein the source module is a receiver module.

10. The apparatus according to claim 5, wherein the plurality of packets include one or more of video data and audio data.

11. The apparatus according to claim 5, wherein source module packet arrival time corresponds to a time that the source module receives a packet from a broadcaster.

12. The apparatus according to claim 5, wherein the synchronization module includes a sink clock frequency adjustment module.

13. The apparatus according to claim 5, wherein the synchronization module includes a sink counter adjustment module.

14. A method, comprising:
receiving, at a sink module, a plurality of packets from a source module, each of the plurality of packets having a source timestamp corresponding to a source module packet arrival time;
associating as a reference timestamp, at a reference timestamp module, the source timestamp of a most recent packet in the plurality of packets having a program clock reference; and
synchronizing, at a synchronization module, a sink counter to a source counter based on a current source timestamp and the reference timestamp,
wherein the source module, the sink module, the reference timestamp module and the synchronization module are co-located on a common device.

15. The method according to claim 14, wherein the sink counter and the source counter are driven by asynchronous clocks.

16. The method according to claim 14, further including inferring the current source timestamp based on a current value of the source counter.

17. The method according to claim 14, wherein the plurality of packets are received at a playback module.

18. The method according to claim 14, wherein the plurality of packets are received from a receiver module.

19. The method according to claim 14, wherein the plurality of packets include one or more of video data and audio data.

20. The method according to claim 14, wherein source module packet arrival time corresponds to the time that the source module receives a packet from a broadcaster.

21. The method according to claim 14, wherein synchronizing the sink counter to the source counter includes adjusting the frequency of a source clock.

22. The method according to claim 14, wherein synchronizing the sink counter to the source counter includes adjusting the sink counter.

23. At least one non-transitory machine-readable medium comprising one or more instructions which, if executed by a common device, cause the common device to:
receive, at a sink module, a plurality of packets from a source module, each of the plurality of packets having a source timestamp corresponding to a source module packet arrival time;
associate as a PCR (program clock reference) timestamp, the source timestamp of the most recent packet in the plurality of packets having a PCR; and
synchronize a sink counter to a broadcaster transmit counter using a current source timestamp and the PCR timestamp,
wherein each step is to be performed via a common device.

24. The medium according to claim 23, wherein the instructions, if executed, further cause the common device to infer the current source timestamp based on a current value of the source counter.

25. The medium according to claim 23, wherein the plurality of packets include one or more of video data and audio data.

26. The medium according to claim 23, wherein source module packet arrival time corresponds to the time that the source module receives a packet from a broadcaster.

27. The medium according to claim 23, wherein the instructions, if executed, further cause the common device to adjust the frequency of a source clock to synchronize the sink counter.

28. The medium according to claim 23, wherein the instructions, if executed, further cause the common device to adjust the sink counter to synchronize the sink counter.

* * * * *